No. 615,181. Patented Nov. 29, 1898.
G. B. HYDE.
LOOSE PULLEY LUBRICATOR.
(Application filed Aug. 10, 1898.)
(No Model.)
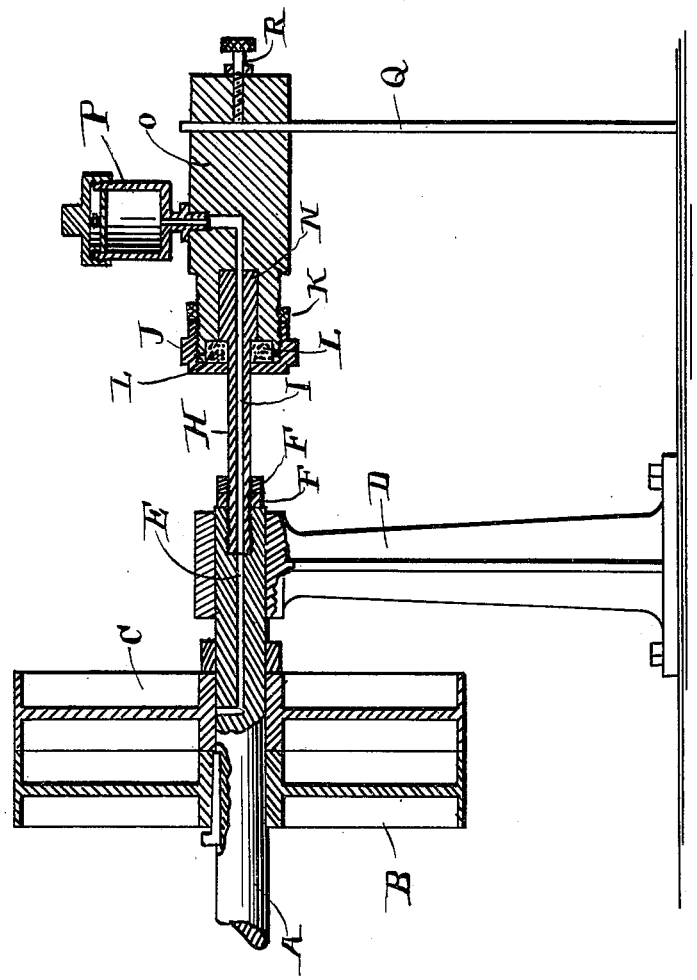
WITNESSES
Harry J Perkins.
Christopher Nordelink
INVENTOR
George B Hyde
By his ATTORNEY.
Edward Taggart

UNITED STATES PATENT OFFICE.

GEORGE B. HYDE, OF GRAND RAPIDS, MICHIGAN.

LOOSE-PULLEY LUBRICATOR.

SPECIFICATION forming part of Letters Patent No. 615,181, dated November 29, 1898.

Application filed August 10, 1898. Serial No. 688,286. (No model.)

*To all whom it may concern:*

Be it known that I, GEORGE B. HYDE, a citizen of the United States, residing at Grand Rapids, in the county of Kent and State of Michigan, have invented new and useful Improvements in Loose-Pulley Lubricators, of which the following is a specification.

This invention relates to a new and useful loose-pulley lubricator; and the invention consists in the device for conveying the oil from a stationary oil-cup to the bearing of a loose pulley, whereby the journal of the loose pulley can be oiled without the use of a revolving oil-cup; and the object of the invention is to furnish a cheap and efficient means for oiling the bearing of a loose pulley. This object I accomplish by means of the mechanism illustrated in the accompanying drawing, in which the figure shows a vertical longitudinal section of a shaft, a loose pulley and also a pulley rigid with the shaft, and the other parts of the oiling mechanism.

In the drawing, A represents a shaft of ordinary construction, to which are attached the rigid pulley B and the loose pulley or idler C. The shaft A is pierced so as to form an oil-conduit. This is shown by E, there being an opening from the oil-conduit to the point near the center of the bearing of the loose pulley C. The shaft is supported on a floor-hanger D or by any other suitable support.

H is a stem screwed into the shaft and adapted to revolve therewith, the portion of the stem H which enters the shaft engaging with a screw-thread in the shaft. In the example of my invention shown in the drawing the stem H is provided with an opening extending entirely through, the same being shown by I.

F and F are jam-nuts upon the screw-threaded portion of H, adapted to retain the stem H in position.

O is a cup-support for the oil-cup. It is provided with a screw-thread, with which engages the gland-nut J, said gland-nut J screwing upon the threaded part of the support O and being held in position by the lock-nut K.

The stem H is constructed with an enlarged end portion N, rotatable in a correspondingly-shaped chamber provided in the stationary frame or support O. A packing-disk or washer L encircles the stem H in juxtaposition to the enlarged end portion N and bears against the frame O, and this disk or washer is held in position by the gland-nut J. The gland-nut and the packing-disk or washer constitute what may be termed a "packing-box" to prevent the escape of oil at this point.

P indicates an oil-cup, preferably a pressure oil-cup, screwed into the stationary frame or support O and communicating with a passage in the latter, which leads to the longitudinal passage I in the stem H. The stem H revolves with the shaft A. The opening from the oil-cup is continuous through the support O from the point of attachment, also through the stem H and the shaft A to a point near the center of the journal-bearing of the loose pulley C. The support O is held in position by means of a suitable support, as Q, said support O being adjusted and retained in its proper position by means of the set-screw R.

By this device the journal of the loose pulley can be oiled at any time from the stationary oil-cup or by means of oil introduced into the stationary support O.

This device can readily be applied to any shaft, it being necessary merely to make a small perforation in the shaft to a point opening to the surface of the journal-bearing for the stationary pulley.

Instead of supporting the oil-cup supporter O by means of a floor-support it may be supported in any suitable manner, it being necessary merely to sustain the weight of the support O and its attachments in proper position to allow the stem H to revolve with the shaft.

Instead of using a pressure oil-cup any other well-known style of cup may be used, and the opening from the central passage E may be made in any direction required.

Having thus described my invention, what I claim to have invented, and desire to secure by Letters Patent, is—

1. The combination of a loose pulley, a rotary shaft supporting said pulley and having a longitudinal oil-conduit opening upon the journal-bearing surface of the pulley, a stem connected to and rotating with the shaft and having a longitudinal opening registering with the oil-conduit therein, a stationary frame in which one end of the stem rotates, said frame having an oil-conduit communicating with the longitudinal opening in the stem, and an oil-cup mounted on said frame and communicating with the oil-conduit therein, and means for sustaining said stationary frame in a fixed position, substantially as described.

2. The combination of a loose pulley, a rotary shaft having a longitudinal oil-conduit opening upon the journal-bearing surface of the pulley, a stem having an oil-conduit registering with the oil-conduit in the shaft, stationary oil-cup support, a gland-nut engaged with said support, a packing-washer secured to the oil-cup support by the gland-nut, a lock-nut for holding the gland-nut in position, and an oil-cup secured to the said stationary support, substantially as described.

3. The combination of a loose pulley, a shaft having a longitudinal oil-conduit opening upon the journal-bearing surface of the pulley, a stem having an oil-conduit registering with the oil-conduit in the shaft, lock-nuts upon said stem, an oil-cup support provided with a screw-thread and an oil-passage communicating with the oil-conduit of the stem, a gland-nut engaged with the screw-thread of the oil-cup support, said stem having an enlarged portion, a washer encircling the stem in juxtaposition to the enlarged portion thereof, and an oil-cup for delivering oil to the passage in the oil-cup support, substantially as described.

4. The combination of a loose pulley, a shaft carrying the loose pulley and provided with an oil-conduit, a stem connected to and rotating with the shaft and having an oil-conduit communicating with that of the shaft, an oil-cup support having an oil-passage communicating with the conduit of the stem, said stem having one end rotating in the oil-cup support, an oil-cup secured to said support for delivering oil to the passage therein, and a standard for sustaining the oil-cup support, substantially as described.

In testimony whereof I have hereunto set my hand in presence of two subscribing witnesses.

GEORGE B. HYDE.

Witnesses:
EDWARD TAGGART,
CHRISTOPHER HONDELINK.